United States Patent Office 3,789,034
Patented Jan. 29, 1974

3,789,034
AZIRIDINE-DIISOCYANATE ADDUCT MODIFIED COMPOSITIONS
Marco Wismer, Gibsonia, and Paul J. Prucnal, Monroeville, Pa., assignors to PPG Industries, Inc., Pittsburgh, Pa.
No Drawing. Filed Mar. 9, 1972, Ser. No. 233,301
Int. Cl. C08g 22/00
U.S. Cl. 260—77.5 AM        39 Claims

ABSTRACT OF THE DISCLOSURE

Reaction products of hydroxy acrylate or methacrylate monomers or hydroxyl bearing polymers and an aziridine-diisocyanate adduct. Coating compositions can readily be provided from such reaction products which are self-curing and which can also be cured by employing a catalyst or with an active hydrogen containing crosslinking agent.

BACKGROUND OF THE INVENTION

In the past polyalkylenimines have been employed as dispersants for clay in cationic latex paper compositions whereby the polyalkylenimines enhance the adhesion of such compositions. Rapid setting typographic inks can be produced by using a pigment binder consisting of an aziridine such as ethylenimine or tris(1-aziridinyl)-phosphine oxide, and a polymeric acid such as rosin or modified rosin. Aziridines when employed in paints and other coating composition almost always involve a film forming reaction where they provide for improved adhesion. The reaction between carboxyl-containing compounds and aziridines has been known in the art for example, such reactions have been utilized to provide binders for solids fuels, wherein, the binders act as a matrix for the solid fuels. Most aziridines when employed in coating compositions have been utilized in a manner whereby the aziridine ring was opened when said aziridine was reacted with monomers, polymers or other desirable compounds. The particular advantage as employed in aziridine is most often cited when aziridines in coatings, is improved adhesion and solvent resistance. However, few have ever achieved substantial commercial status as components in the coatings art except those which use the carboxyl-aziridine reaction to provide improved adhesion. Some of the components that aziridines have been utilized with to provide coating compositions include for example, copolymers of vinyl chloride; various condensation polymers with NCO end groups, acrylate-methacrylate copolymers containing OH and CO$_2$H groups, thermosetting resin, etc., epoxy resin; amine-cured epoxy resins; poly-acid or polyamine curing agents; polysiloxanes with active end groups; polyols; polyesters; and the like. Likewise, paint compositions have been formulated from a reaction product of a hydrocarbon isocyanate with ethylenimine (U.S. Pat. No. 2,886,455). Also, reaction products of alkylenimines and polyfunctional epoxides have been useful as curing agents for carboxyl group-containing or terminated polymers (U.S. Pat. No. 3,369,016). Coating polymers that have found substantial commercial use include iminated alkyl methacrylate type polymers (U.S. Pat. No. 3,290,416) which employs an aziridine ring opening mechanism and thermosetting coating compositions containing interpolymers of hydroxyl-containing unsaturated esters which have been iminated with an alkylenimine (U.S. Pat. No. 3,290,417).

DESCRIPTION OF THE INVENTION

Now it has been discovered that reaction products can be prepared from a hydroxy group containing organic material such as a hydroxy acrylate or methacrylate monomers or hydroxyl bearing polymer and an aziridine diisocyanate adduct containing an isocyanate group. These reaction products can be employed to provide coating composition that will self-cure and which may be readily cured by utilizing a catalyst or crosslinking agent.

More particularly this invention relates to reaction products of hydroxy group containing organic material such as simple organic compounds or polymers, and an aziridine-diisocyanate, adduct containing an isocyanate group. These reaction products in many instances will cure at ambient temperature with or without acid catalysts, to provide suitable coating compositions. In other instances the reaction products herein may be crosslinked at elevated temperatures with an active hydrogen-containing organic material having groups selected from the group consisting of carboxyl, hydroxyl, mercapto and amino and having a plurality of active hydrogen atoms to provide coatings that have excellent appearance and exceptional hardness.

The reactive product of this invention can readily be employed as interior or exterior room temperature curing vehicles; as a base for seamless floor compositions; elastomer coating and as thermosetting coil coating compositions as well as for other useful purposes.

Some of the advantages that are apparent with the reactive products and coating compositions include the preparation of vehicles which are of substantial low cost, yet provide films that have excellent properties. Likewise, the vehicles are amendable to allow the use of a large number of varied monomers and polymers to build in particular desired properties. Another advantage is that the vehicles herein can be employed to provide high solids coatings which aid in the control of solvent pollution.

The reaction products herein are prepared by reacting a hydroxy acrylate or methacrylate monomer or hydroxyl bearing polymer with an aziridine-diisocyanate adduct containing isocyanate groups.

The adduct employed in this invention is comprised of a reaction product consisting of a diisocyanate and an aziridine.

The diisocyanate employed may be essentially any organic diisocyanate, such as hydrocarbon diisocyanates or substituted hydrocarbon diisocyanates, aromatic, aliphatic and cycloaliphatic diisocyanates, and combinations of these types. Representative compounds include 2,4-toluene diisocyanate, p-phenylene diisocyanate, 4-chloro-1, 3-phenylene diisocyanate, 4,4'-diphenylene diisocyanate, 1,5-napthalene diisocyanate, 1,4-tetramethylene diisocyanate, 1,6-hexamethylene diisocyanate, 1,10-decylmethylene diisocyanate, 1,4-cyclohexylene diisocyanate, 4,4'-methylene-bis(cyclohexyl isocyanate) and 1,5-tetrahydronapthylene diisocyanate. Compounds such as 2,4-toluene diisocyanate in which the two isocyanate groups differ in reactivity are particularly desirable as is isophorone diisocyanate. The diisocyanate may contain other substituents although those which are free from reactive groups other than the two isocyanate groups are ordinarily preferred. In the case of the aromatic compounds, the isocyanate groups may be attached either to the same or to different rings.

Most diisocyanates generally have the formula OCNR$_1$NCO wherein R$_1$ is selected from the group consisting of arylene, such as p-phenylene, diphenylene, and the like; alkarylene, such as toluene diphenylene, and the like; alkylene such as dimethylbiphenylene, and the like; alkylene, such as tetramethylene, hexamethylene, trimethylene, and the like; aralalkylene, such as methylene-bisphenyl, dimethylmethylene-bisphenylene; and alicyclic such as isophorone, methylcyclohexylene, and the like.

The preferred dissocyanates in this invention are isophorone diisocyanate, toluene diisocyanate and hydrogenated toluene diisocyanate.

The particular diisocyanate employed is reacted with an aziridine. Various aziridines and substituted aziridines can be used to modify the isocyanate groups. These correspond generally to the formula:

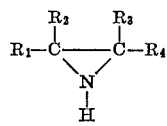

where $R_1$, $R_2$, $R_3$, and $R_4$ are each either hydrogen; alkyl, such as methyl, ethyl, propyl, or the like, having, for example, up to about 20 carbon atoms; aryl, such as phenyl or the like; alkaryl, such as tolyl, xylyl or the like; or aralkyl, such as benzyl, phenethyl or the like.

It is intended that the groups designated by the above formula include substituted radicals of the classes indicated, including substituents such as cyano, halo, amino, hydroxy, alkoxy, carbalkoxy, and nitrile. The substituted groups may thus be cyanoalkyl, haloalkyl, aminoalkyl, hydroxyalkyl alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction (self-reaction). For this reason, in most of the compounds of the class described, one and usually several of the groups designated by $R_2$ through $R_4$ will represent hydrogen. However, the efficacy of the various imines within the above formula does not depend upon the particular nature of any of the substituents and thus, beneficial results are obtained with interpolymers modified by any of those compounds within the above class.

To exemplify the nature of the materials which fall within the scope of the formula set forth above, a number of specific alkylenimines are as follows:

Ethylenimine (aziridine)
1,2-propylenimine (2-methyl aziridine)
1,3-propylenimine (azetidine)
1,2-dodecylenimine (2-decyl aziridine)
1,1-dimethyl ethylenimine (2,2-dimethyl aziridine)
Phenyl ethylenimine (2-phenyl aziridine)
Toly ethylenimine (2-(4-methylphenyl) aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl) aziridine)
Aminoethyl ethylenimine (2-(2-aminoethyl) aziridine)
2-methyl propylenimine (3-methyl azetidine)
3-chloropropyl ethylenimine (2-(3-chloropropyl) aziridine)
p-Chlorophenyl ethylenimine (2-(4-chlorophenyl) aziridine)
Methoxyethyl ethylenimine (2-(2-methoxyethyl) aziridine)
Dodecyl aziridinyl formate (dodecyl 1-aziridinyl carboxylate)
Carbethoxyethyl ethylenimine (2-(2-carbethoxyethyl) aziridine)
N-ethyl ethylenimine (1-ethyl aziridine)
N-butyl ethylenimine (1-butyl aziridine)
N-(2-aminoethyl) ethylenimine (1-(2-aminoethyl) aziridine)
N-(phenethyl) ethylenimine (1-(2-phenylethyl) aziridine)
N-(2-hydroxyethyl) ethlenimine (1-(2-hydroxyethyl) aziridine)
N-(cyanoethyl) ethylenimine (1-cyanoethyl aziridine)
N-phenyl ethylenimine (1-phenyl aziridine)
N-tolyl ethylenimine (1-(2-methylphenyl) aziridine)
N-(p-chlorophenyl) ethylenimine (1-(4-chlorophenyl) aziridine)

Because of their availability and because they have been found to be among the most effective, the preferred aziridines are ethylenimine and 1,2-propylenimine.

The aziridine-diisocyanate adduct employed herein is prepared at ambient temperature and since the reaction is highly exothermic a means for constantly cooling the reaction is employed. The aziridine is generally added dropwise into a reactor containing the diisocyanate, said reactor is usually equipped with a condensor, a stirring means and a temperature measuring device. The preferred molar ratio of the diisocyanate to aziridine is about 1.0 to 1.0 and it is also preferred that the adduct comprise from about 5 percent to about 50 percent based on weight of the total reaction product, however, a preferred range is from about 10 percent to about 30 percent.

When the adduct is prepared by the method described hereinabove, it is generally refrigerated until it is ready to be reacted with the hydroxy group containing organic material herein, because the adduct undergoes slow reaction with itself at room temperature. Alternately, the freshly generated adduct may be immediately reacted with the hydroxy acrylate or methacrylate monomer or hydroxyl bearing polymer when desirable.

As previously stated reaction products herein are prepared by reacting a hydroxy acrylate or methacrylate monomer or hydroxyl bearing polymer with the adduct hereinabove, however, the preferred hydroxy group containing organic materials are those having a hydroxyl functionality of at least 3.0 and most preferred are acrylic polymers having a hydroxyl functionality of at least 3.0.

The hydroxy acrylate or methacrylate monomer or hydroxyl bearing polymer utilized in the present invention include hydroxyalkyl esters of acrylic and methacrylic acid such as 2-ethylhexyl acrylate, 2-hydroxyethyl methacrylate, 2-hydroxypropyl methacrylate, 3-hydroxyethyl methacrylate, 4-hydroxybutyl methacrylate, and mixtures of such esters are preferred, however, other corresponding esters of other unsaturated acids, for example, ethacrylic acid, crotonic acid, and similar acids up to about 6 carbon atoms, can also be employed. These hydroxyalkyl esters readily polymerize with other alpha, beta ethylenically unsaturated monomers to provide hydroxy functional acrylic polymers which are likewise useful in the present invention. Examples include monoolefinic and diolefinic hydrocarbons, halogenated monolefinic and diolefinic hydrocarbons, esters of organic and inorganic acids, organic nitrites, carboxylic and monomers, unsaturated organosilanes and the like. Specific embodiments of these monomers are set forth in U.S. Pat. Nos. 3,118,853 and 3,417,161 and are incorporated by reference herein.

Other hydroxyl-containing polymers that are of use in the invention include the following polymers:

(A) Polymers of an unsaturated primary aliphatic alcohol with at least one monomer containing a $CH_2=C<$ group:

One particularly useful product of this type is a polymer of allyl alcohol and styrene having the following structure:

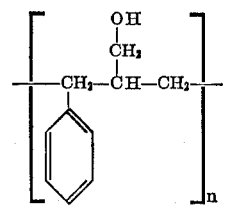

Preferably, the value of $n$ is in the range of about 4 to 10, and several products of this general class are available commercially. In the preparation of such polymers, the allyl alcohol can be replaced by other alcohols containing a polymerizable $CH_2=C<$ group, for example, methallyl alcohol, and the like, with aliphatic unsaturated alcohols containing up to about 10 carbon atoms being particularly useful. The monomeric material which is polymerized with the unsaturated alcohol to form the materials of this class may be selected from the group of polymerizable ethylenically unsaturated monomeric materials set forth hereinabove, with styrene and acrylonitrile being particularly preferred. Another route to this type of polymer is through the hydrogenation of acrolein copolymers.

(B) Polyesters prepared by the reaction of polyols with polycarboxylic acids: When polyols such as thylene glycols, propylene glycol, diethylene glycol, or the like glycols and other polyols containing from about 2 to 12 carbon atoms are reacted, preferably in excess with dicarboxylic acid (or anhydride) such as adipic acid, succinic acid, maleic acid, fumaric acid, phthalic acid, isophthalic acid, tetrachlorophthalic acid, or other dicarboxylic acids containing up to about 12 carbon atoms, there is obtained a polyester having free hydroxyl groups attached to the polymer chain. Such polyesters may also be reacted with anhydrides of carboxylic acids to form the adducts utilized in preparing the useful compositions of this invention.

(C) Polyethers prepared, for example, by the reaction of a polyol such as sucrose, sorbitol, glycerol, or the like containing up to about 10 carbon atoms, with an alkylene oxide such as ethylene oxide, propylene oxide, butylene oxide, or the like, or a mixture of such oxides, can also contain free hydroxyl groups when the polyol component is present in excess. The resulting hydroxyl-containing polyethers may be reacted with the aziridine-diisocyanate adduct herein or the polyethers may be reacted with anhydrides and carboxylic acids to form esterified adducts which can also be reacted with the aziridine-diisocyanate adduct, described herein above, to provide for useful compositions.

(D) Polymers of vinyl alcohol containing recurring units of the structure:

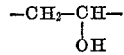

may be employed. The hydroxyl groups in the polyvinyl alcohol react readily with the aziridine-diisocyanate herein or these polymers can be reacted with carboxylic acid anhydrides such as maleic anhydride to form esterified adducts which can also be reacted with the aziridine-diisocyanate adducts herein.

(E) Hydroxyl-modified vinyl halide polymers: These polymers are preferably copolymers of a vinyl halide such as vinyl chloride or vinyl bromide with a vinyl ester of an aliphatic monocarboxylic acid such as vinyl acetate, vinyl propionate, vinyl butyrate, or the like, which polymers are modified by having hydroxyl groups introduced into the copolymer chain by hydrolysis of at least a portion of the ester linkages in the copolymer structure. These hydroxyl-modified polymers react readily with the aziridine-diisocyanate adducts herein. Carboxylic acid anhydrides react with some such hydroxyl groups to form esterified adducts which are also useful for reacting with the aziridine-diisocyanate adducts herein.

(F) Epoxide resins: Many of the epoxide resins are reaction products of epihalohydrins such as epichlorohydrin with dihydric phenols such as bis(4-hydroxyphenyl) 2,2-propane. Some of these materials possess hydroxyl groups along the epoxide polymer structure. These hydroxyl groups may also be reacted with the aziridine-diisocyanate adducts herein or with carboxylic acid anhydrides to form esterified adducts; however, care must be taken in the reaction to prevent curing of the epoxide resin by the anhydride. Likewise, these esterified adducts can be reacted with the aziridine-diisocyanate adducts herein.

While the above classes of polymers are representative of those which may be employed in forming the compositions of this invention, they by no means represent all of the hydroxy-containing materials which may be used. For example, it is also possible to utilize silicon-containing polymers which possess free hydroxyl groups.

However for purposes of the present invention it is most preferred to employ hydroxy group containing organic material having a functionality of at least 3.0 for example, hydroxy-containing acrylic interpolymers.

Hydroxy-containing acrylic interpolymers that may be employed in the present invention include those provided for by reacting an ethylenically unsaturated carboxylic acid amide, an alpha,beta ethylenically unsaturated hydroxyl-containing monomer and at least one other alpha, beta ethylenically unsaturated monomer. Also hydroxy acrylic interpolymer provided for by polymerizing an organic nitrile such as acrylonitrile or methacrylonitrile, an alpha,beta ethylenically unsaturated hydroxyl-containing monomer and at least one other alpha,beta ethylenically unsaturated monomer. The polymerization processes employed to carry out the production of such interpolymer are well known in the art and utilizes such catalysts as benzoyl peroxide, di-t-butyl peroxide and the like, as well as, chain transfer agent such as dodecyl mercaptan, tertiary dodecyl mercaptan, and the like. These hydroxy-containing interpolymers are preferred and react readily with the aziridine-diisocyanate adduct herein. The preferred hydroxy-containing monomers include hydroxyalkyl esters.

The reaction products and compositions of the invention herein are prepared by reacting the hydroxy acrylate or methacrylate monomer or hydroxyl bearing polymer with the adduct described herein above.

The particular amount of the various components is not critical and, of course, can be varied somewhat depending on the characteristics, desired in the final reaction product. For example, when a hydroxy-containing acrylate or methacrylate monomer, polymer or copolymer thereof is utilized the amount employed may vary from as low as about 50 percent to as high as about 95 percent or higher based on the total weight of the reaction product, however, for purposes of this invention it is preferred that the hydroxy-containing component be present in an amount from about 90 percent to about 70 percent based on weight of the total reaction product.

In reacting the hydroxy acrylate or methacrylate monomer or hydroxyl bearing polymer with the adduct described hereinabove, mild conditions are generally employed, for example, when reacted in absence of a catalyst temperature from about 50 to 100° C. may be readily employed and if a catalyst is employed then the reaction may be carried out at ambient temperature. Catalysts that may be employed include tertiary amines such as dimethylbenzyl amine, 1-ethoxy-3-dimethyl amino propane, endoethylene, piperazine, dimethyl ethyl amine and the like, as well as other known basic catalysts such as, for example, alkali carbonates such as sodium carbonate, alkali metal phenolates or alkali metal alkoxides such as sodium methoxide, or other metal containing compounds such as dibutyl tin di-2-ethyl hexoate, dibutyl tin dilaurate, stannous octoate, and the like.

The reaction products herein can readily be employed as a coating composition that will self-cure at ambient or elevated temperatures when the proper selection of reactive components are present. For example, when cured at such schedule as 45 minutes at 200° F., 10 minutes at 350° F. and 2 minutes at 500° F., the films provided have excellent appearance and exceptional hardness. Ambient or elevated temperature curing may be accelerated by employing a catalyst such as organic or inorganic acid which include hydrochloric acid, methane sulfonic acid, trichloroacetic acid, sulfuric acid and the like.

This method can be employed most successfully to introduce 1-aziridinyl groups in polymers which could not be used to form isocyanato-terminated prepolymers.

In addition to the above method of preparing the reaction products herein, another method which may be employed which provides for contacting and reacting hydroxy group containing organic material, aziridine, and diisocyanate, all at the same time.

The success of this method is somewhat limited because of the competing reactions and the structure of the end product.

Another method by which the reaction product of the present invention are provided is to react the alkylenimine with an active hydrogen-containing compound, described herein below, and subsequently reacting the product with an isocyanate or isocyano-terminated prepolymer.

However, the method wherein the adduct is formed first and subsequently reacted with hydroxyl-containing compound is especially preferred when a high hydroxyl functional system is employed such as hydroxyl functional acrylic polymers.

Since the reaction products of the invention herein have pendant 1-aziridinyl groups they will readily cross-link and cure at elevated temperatures with an active hydrogen containing organic material having a plurality of active hydrogens. The active hydrogen group(s) react with the pendant 1-aziridinyl group(s) to provide the tough cross-linked films herein. Thus, suitable active hydrogen-containing groups as determined by the Zerewitinoff method which are reactive with an 1-aziridinyl group include —OH, —NH$_2$, —NH—, COOH, —SH and the like groups. However, of these, only the carboxyl-1-aziridinyl reaction can normally be utilized for practical room temperature cures. Examples of suitable types of organic compounds containing at least one active hydrogen-containing group which are reactive with an 1-aziridinyl group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane thiols having one or more —SH groups; polyamines including both aromatic, aliphatic and heterocyclic diamines, triamines, tetramines and the like, as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups —SH group as well as those which contain an amino group and a —SH group and the like.

The molecular weight of the organic material having a plurality of active hydrogens may vary over a wide range. Preferably, the active hydrogen containing organic compounds at least one of the organic compounds is an organic polyol such as those used in the production of the polyurethane plastic which have a molecular weight of at least about 200 and preferably beetween about 500 and about 5,000 with an hydroxyl number within the range of from about 25 to about 800 and acid numbers, where applicable, below about 5. These polyols most preferably have hydroxyl numbers of from about 10 to about 350, the best results being obtained with those having an hydroxyl number from about 30 to about 250. Aliphatic diols and triols are most preferred for this purpose.

Other polyols include any suitable hydroxyl polyester which are obtained, for example, from polycarboxylic acids and polyhydric alcohols. Any suitable polycarboxylic acid may be used such as for example, oxalic acid, malonic acid, succinic acid, glutaric acid, adipic acid, pimelic acid ,suberic acid, azelaic acid, sebacic acid, brassylic acid, thapsic acid, maleic acid, fumaric acid, glutaconic acid, μ-hydromuconic acid, β-hydromuconic, μ-butyl-μ-ethyl-glutaric acid, μ-β-diethylsuccinic acid, isophthalic acid, terephthalic acid, hemilellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perlenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexenetriol triethanolamine, pentaerythritol, sorbitol and the like.

Still other suitable polyols include polyhydric polyalkylene ethers which include for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used, such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carobn atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers Inc. (1951) or in U.S. Pat. 1,922,459.

Likewise, any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Pats. 2,862,972 and 2,900,368.

The hydroxyy polyester may also be a polyester amide such as is obtained, for example, by including some amine or amino alcohols in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

In addition any suitable polyacetal may be used, such as, for example, the reaction product of formaldehyde or other suitable aldehyde with a polyhydric alcohol such as those disclosed above for use in the preparation of the hydroxyl polyesters.

Also any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as for example, 1-butene-1,4-diol, 1,3-butadiene-1,4-diol, 2-pentene-1,4-diol, 2-hexene-1,6-diol, 2-heptene-1,7-diol and the like; alkyne diols such as, for example, 2-butyne-1,4-diol, 1,5-hexadyene-1,6-diol and the like, alkene triols such as, for example, 1,3,6-hexanetriol, 1,3,7-heptane triol, 1,4,8-octane triol, 1,6,12-dodecane triol and the like; alkene triols such as, 1-hexene-1,3,6-triol and the like; alkyne triols such as, 2-hexyene-1,3,6-triol and the like; alkane tetrols such as, for example, 1,2,5,6-hexane tetrol and the like; alkene tetrols such as, for example, 3-heptane-1,2,6,7 tetrol and the like; alkyne tetrols such as, for example, 4-octyne-1,2,7,8 tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like.

Finally, any suitable polyamine may be used including for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino 5-aminomethyl pyrimidine, 2,5-diamino-1,3,4-thiadiazol and the like.

Other active hydrogen containing materials which do not necessarily fit without any of the previously set forth classes of compounds and which nevertheless contain active hydrogen-containing groups which are quite suitable for the production of the compositions of the present invention are pentaerythritol, sorbitol, triethanolamine, mannitol, N,N,N',N'-tetrakis(2-hydroxy propyl) ethylene diamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

Also suitable are the oil modified alkyd resins, partially saponified copolymerization products containing vinyl acetate, epoxy resins which contain terminal hydroxyl groups and copolymers obtained by polymerization of low molecular weight olefins such as ethylene, propylene, butylene or any other olefin having the formula $C_nH_{2n}$ and preferably containing one to seven carbon atoms, and carbon monoxide at elevated pressure in which the keto groups have been wholly or partially transformed by reduction to secondary hydroxyl groups, as disclosed in Journal of American Chemical Society 74, 1509 (1952). Also various hydroxyl-containing copolymers such as methyl methacrylate, 2-hydroxyethyl acrylate copolymer can be utilized, as well as diisocyanate prepolymers such as isocyanato-terminated adduct of toluene diisocyanate and castor oil, or other prepolymers wherein the castor oil is replaced by a polyether, poly(oxytetramethylene) glycol, polyester polyol or sucrose polyether polyol.

Other active hydroxyl-containing resinous materials are, likewise, useful, for example, acrylic monomers. Acrylic monomers containing reactive hydrogen atoms are hydroxy alkyl esters of ethylenically unsaturated acids. The preferred hydroxy alkyl esters are esters of acrylic acid, methacrylic acid, and other alpha,beta-ethylenically unsaturated carboxylic acids. Examples include 3-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate, 4-hydroxybutyl methacrylate, and corresponding esters of other unsaturated acids. For example, ethacrylic acid, crotonic acid, and similar acids of up to about 6 carbon atoms. There may also be employed mono- or di-esters of unsaturated dicarboxylic acids such as maleic acid, fumaric acid, and itaconic acid in which at least one of the esterifying groups contains a hydroxyl group. Examples of such esters include mono(2-hydroxyethyl)maleate, mono(2-hydroxyethyl) fumarate, bis(2 - hydroxyethyl)maleate, mono(2-hydroxypropyl) maleate, bis(2-hydroxypropyl) maleate, mono(2-hydroxyethyl)itaconate, bis(2-hydroxyethyl)itaconate, and 2-hydroxyethylbutyl maleate.

Likewise, essentially any polycarboxylic acid group containing acrylic resins can be utilized in the invention. These acrylic resins may be broadly described as interpolymers of esters of unsaturated carboxylic acids, unsaturated carboxylic acids and at least one other ethylenically unsaturated monomer. The acid monomer of the interpolymer is usually acrylic or methacrylic acid but other ethylenically unsaturated monocarboxylic and dicarboxylic acids such as ethacrylic acid, crotonic acid, maleic acid or other acids up to about 6 carbon atoms can also be employed. Ordinarily the acid and ester each comprise about one percent to about 20 percent by weight of the interpolymer, with the remainder being made up of one or more copolymerizable ethylenically unsaturated monomers. Most often used are the alkyl acrylates such as ethyl acrylate, butyl acrylate, 2-ethylhexyl acrylate, and the like; the alkyl methacrylates such as methyl methacrylate, butyl methacrylate, lauryl methacrylate, etc., and the vinyl aromatic hydrocarbons such as styrene and vinyl toluene, but others can also be utilized.

Also of interest as crosslinking agents are carboxylic groups containing acrylic resins which also contain hydroxyl groups. These interpolymers are essentially described above, but in addition contain from about 1 percent to about 20 percent by weight of a hydroxyalkyl ester of acrylic acid and methacrylic acid or other alpha, beta-ethylenically unsaturated carboxylic acid, for example, hydroxy esters of acrylic or methacrylic acid wherein the hydroxyalkyl group contains up to 5 carbon atoms such as 2-hydroxypropyl acrylate, 2-hydroxyethyl methacrylate, 2-hydroxypropyl methacrylate, 3-hydroxypropyl methacrylate, 4-hydroxybutyl methacrylate. Corresponding esters of other unsaturated acids, for example, acrylic acid, crotonic acid, maleic acid, and similar acids of up to 6 carbon atoms can also be employed.

Likewise, in addition to the active hydrogen-containing organic material other materials which include dimer and trimer acids, acid anhydrides, acid-terminated polyethers, and the like may be utilized. Typical anhydrides include nadic methyl anhydride, dodecyl succinic anhydride and the like.

The active hydrogen-containing organic material may vary but the most suitable proportions comprise an amount from about 5 percent to about 40 percent by weight based on the total weight of the reaction product herein.

The compositions of the invention herein can easily be pigmented. Any conventional pigment known in the art may be utilized herein. For example, iron oxide, encapsulated aluminum, lead silica chromate, carbon black, titanium dioxide, talc, barium sulfate, and the like, as well as combinations of these and similar pigments. Color pigments such as cadmium red, cadmium yellow, phthalocyanine blue, phthalocyanine green, chrome yellow, toluidine red, hydrated iron oxide, and the like may be included if desired. However, it is desirous that the pigments which are non-acidic be employed as they provide the most useful compositions.

Other components in the coating compositions which may be used, if desired, include, for example, wetting agents, flow, fungicides, antioxidants, and the like, as well as, dyes, fillers, flame proofing agents, plasticizers, paraffin oils, silicone oils, such as dimethyl siloxanes, and the like.

The following examples set forth specific embodiments of the instant invention. However, the invention is not to be construed as being limited to these embodiments for there are, of course, numerous possible variations and modifications. All parts and percentages in the examples as well as through out the specification are by weight unless otherwise indicated.

Example I

A hydroxyl-functional acrylic polymer was prepared in the following manner. A round bottom reactor vessel equipped with a condenser, stirrer, thermometer and a heating means was charged with the following:

Acrylic polymer

| | Parts by weight |
|---|---|
| 2-hydroxyethyl acrylate | 150 |
| Methacrylonitrile | 143 |
| Styrene | 161 |
| Butyl acrylate | 195 |
| Solvesso 150 (aromatic hydrocarbon solvent—B.P. range 185°–200° C.) | 150 |
| Tertiary dodecyl mercaptan | 22.5 |

This charge was heated to about 110° C. and held there for about 5 hours, while a catalyst composition comprising 10 parts of alpha,alpha-azobisisobutyronitrile, 188 parts Cellosolve acetate and 188 parts of Solvesso 150 was added then the reaction was permitted to continue for about 2 hours at 110–115° C. Finally, the polymer produced was reduced with 125 parts Cellosolve acetate and 125 parts Solvesso 150.

This polymer had the following characteristics:

| | |
|---|---|
| Hydroxyl number | 62.2 |
| Solid content (percent) | 48.4 |
| Viscosity (Gardner-Holdt) | T |
| Color (Gardner) | 1— |

Adduct solution

A total of 87 parts of 2,4-toluene diisocyanate and 80 parts benzene were charged into a reactor equipped with a means for supplying a nitrogen atmosphere and a means to control an exothermic reaction. To the benzene-diisocyanate mixture 28.5 parts of 1,2-propylenimine were added in a dropwise fashion while maintaining the temperature below 35° C. Then after the addition was complete, the adduct solution was stirred for about 1 hour.

Reaction product

This reaction product was comprised of the following:

| | Equivalents | Parts by weight |
|---|---|---|
| Polymer (above) | 1.0 (OH) | 900 |
| Adduct solution (above) | 0.5 (NCO) | 230 |

These components were charged into a reactor, stirred 11 hours and allowed to stand overnight. Infrared curves of this composition showed that there were substantially no NCO groups present.

The compositions of Example I were drawn down on panels of aluminum coil stock. These panels when baked for 15 minutes at 350° F. provided films of about 1.0 mils dry film thickness. The physical properties of these films were evaluated and the results are set forth below.

| Impact,[1] direct | Sward hardness (glass=100) | Mandrel bend (⅛-inch) |
|---|---|---|
| 30 | 46 | No failure. |

[1] Gardner—inch pounds.

This product was also evaluated for chemical and solvent resistance to nitric acid, sodium hydroxide, acetone and xylene. A drop of the staining liquids were place on the composition surface and permitted to remain there overnight. In the morning the staining liquid were removed and surface was examine for staining. The results were as follows:

Chemical and solvent resistance

| | |
|---|---|
| 10% HNO₃ | Slight staining |
| 10% NaOH | No effect |
| Acetone | No effect |
| Xylene | No effect |

Example II

This reaction product was similar to that of Example I except that the hydroxyl-functional acrylic polymer was comprise of:

| | Parts by weight |
|---|---|
| Hydroxyethyl acrylate | 144 |
| Methacrylonitrile | 199 |
| Styrene | 253 |
| Butyl acrylate | 314 |
| Solvesso 150 | 209 |
| Tertiary dodecyl mercaptan | 31.3 |

Likewise, the polymerization technique employed was the manner similar to Example I but utilizing a catalyst and comprising 13.9 parts alpha, alpha-azobisisobutyronitrile, 244 parts Solvesso 150 and 276 parts Cellosolve acetate. The final polymer was reduced with 173 parts of Cellosolve acetate.

A total of 700 parts of the above polymer were combined with 215 parts of an adduct solution similar to that of Example I* to provide the compositions herein. The polymer and adduct were combined in such a manner that the ratio of OH equivalents to NCO equivalents was 1 to 1. The films produced from these compositions were baked at 10 minutes at 350° F. and subsequently were evaluated as in Example I and results were as follows:

| Impact | | Sward hardness (glass=100) | Mandrel bend (⅛-inch) |
|---|---|---|---|
| Direct | Reverse | | |
| 20 | 6 | 44 | No failure. |

STAIN RESISTANCE

| 10% HNO₃ | 10% NaOH | Acetone | Xylene |
|---|---|---|---|
| Moderate staining | No effect | No effect | No effect. |

Example III

The following components were charged into the reactor as in Example I:

| | Parts by weight |
|---|---|
| Hydroxyethyl acrylate | 102 |
| Styrene | 222 |
| 2-ethylhexyl acrylate | 99 |
| Methyl methacrylate | 228 |
| Solvesso 150 | 150 |
| Tertiary dodecyl mercaptan | 22 |

*Adduct solution 50 percent solids content in either ethyl acetate, benzene or combination thereof.

The reactants were heated to 100° C. under a nitrogen atmosphere and the following catalyst solution was added by means of a dropping funnel over a 4 hour period while maintaining the temperature at about 100—100° C.

Catalyst solution

| | Parts by weight |
|---|---|
| Alpha,alpha-azobisisobutyronitrile | 10.0 |
| Cellosolve acetate | 188 |
| Solvesso 150 | 188 |

After the catalyst addition was complete, the temperature was maintained for 2 hours and finally the polymer provided was reduced with 125 parts Cellosolve acetate and permitted to cool.

The characteristics produced by this polymer are as follows:

| | Parts by weight |
|---|---|
| Solids content (percent) | 51.1 |
| Hydroxyl number | 33.9 |
| Viscosity (Gardner-Holdt) | T–U |
| Color (Gardner) | 1– |

This polymer was then reacted with an adduct solution as in Example II in the following manner:

| | Equivalents | Parts by weight |
|---|---|---|
| Polymer (above) | 1.0 (OH) | 1,650 |
| Adduct (Example I) | 1.0 (NCO) | 505 |

These reactants were heated to about 40° C. under a nitrogen atmosphere for 4 hours and further stirred for an additional 7 hours.

Infrared curves of this reaction product showed that substantially all of the NCO groups had been reacted. This copolymer was drawn down on electrolytic tin plate and baked at several schedules, then the solvent resistance, boiling water resistance and fabrication were evaluated.

SOLVENT RESISTANCE

| Bake | | | | Boiling water resistance (½ hour) |
|---|---|---|---|---|
| Minute | Temperature, °F. | Cellosolve acetate | Solvesso 150 | |
| 8 | 300 | Very slight effect | No effect | Good. |
| 20 | 300 | No effect | do | Do. |
| 8 | 350 | do | do | Good to excellent. |

When the system having been baked at 20 minutes at 300° F. and 8 minutes at 350° F. were fabricated into container lids and caps, the films showed good fabrication even at extreme stress points.

Example IV

A reaction product similar to that of Example III was cured employing nadic methyl anhydride, endo-cis-bicyclo (2.2.1)-5-heptene - 2,3 - dicarboxylic anhydride (4-endo-methylenetetrahydrophthalic anhydride), and para-toluene sulfonic acid. These compositions were permitted to air dry and were also baked and subsequently solvent resistance was evaluated. A 3 mils wet film was provided from the following compositions:

Composition A (Control) reaction product of an acrylic interpolymer of 22 percent methacrylonitrile, 16 percent 2-hydroxyethyl acrylate, 34 percent butyl acrylate and 28 percent styrene at 50 percent solid content in Solvesso 150 (high boiling aromatic hydrocarbon—B.P. 185–200° C.) and Cellosolve acetate, and an adduct as employed in Example I. The ratio of equivalents of acrylic interpolymer (OH) to adduct (NCO) was 1.0/1.0.

Composition B

| | Parts by weight |
|---|---|
| Reaction Product (Composition A) | 40 |
| Nadic methyl anhydride | 1.9 |
| Cellosolve acetate | 5 |

Composition C

| | Parts by weight |
|---|---|
| Reaction Product (Composition A) | 40 |
| Para-toluene sulfonic acid | ≅0.5 |
| Cellosolve acetate | 5 |

The solvent resistance of these compositions were evaluated as air-dried. The solvent resistance test comprised soaking said composition in the particular solvent for 25 hours.

SOLVENT RESISTANCE

| Composition | Tack-free time (minutes) | Acetone | Cellosolve acetate | Xylene |
|---|---|---|---|---|
| A | 60 | Fair to poor | Poor | Fair to poor. |
| B | 40 | Fair | Fair to poor | Do. |
| C | 40 | Poor | Poor | Do. |

The solvent resistance of the same compositions were also evaluated when baked for 15 minutes at 350° F. and the results were as follows:

| Composition | Acetone | Cellosolve acetate | Xylene |
|---|---|---|---|
| A | Fair | Fair | Good. |
| B | Good | Good | Do. |
| C | Poor | Fair | Fair. |

In addition to good solvent resistance properties of these compositions very hard films can readily be obtained, for example, films having pencil hardness of 6-H are possible.

Example V

A pigmented coil coating composition was formulated in the following manner and incorporated therein—the reaction product of Example I, said reaction product being 51.2 percent total solids reduced in a 50:50 blend of Cellosolve acetate and Solvesso 150 and comprised of about 80 percent by weight of a hydroxyl-containing acrylic interpolymer containing 23.1 percent 2-hydroxyethyl acrylate, 22.0 percent methacrylonitrile, 24.8 percent styrene, and 30.1 percent butyl acrylate; and about 20 percent of an adduct comprised of 2,4-toluene diisocyanate and propylenimine.

PIGMENT PASTE

| | Parts by weight |
|---|---|
| Titanium dioxide | 264 |
| Reaction product (Example I) | 185 |
| Cellosolve acetate | 27 |

Said paste was ground in a conventional ball mill until a grind of about 6.5 (Hegman) reading was obtained. This paste was employed in formulating a composition as follows:

Composition A

| | Parts by weight |
|---|---|
| Pigment paste (above) | 100 |
| Reaction product (Example I) | 183 |
| Cellosolve acetate | 10 |
| 2-ethylhexyl acrylate - (homopolymer - 50 percent solids in a solvent blend comprising 58.5 percent xylene and 41.5 butanol) | 2 |

Said composition was drawn down with an 0.042 mil wire wound drawbar over 0.24" treated aluminum coil stock. When the composition was baked for 6 and 90 seconds, respectively, at 500° F. the films provided has the following properties:

| Bake, seconds at 500° F. | Pencil hardness | Reverse impact [1] (inch pounds) | | | | | | Vise bend | |
|---|---|---|---|---|---|---|---|---|---|
| | | 10 | 20 | 30 | 40 | 50 | 60 | 3T | 4T |
| 65 | H | 0 | 0 | 0 | 1 | 2 | 4 | 4 | 0 |
| 90 | H | 0 | 0 | 0 | 1 | 2 | 3 | 2 | 0 |

[1] Rating scale 0 to 10, 0 being perfect.

When the above composition was further modified by the addition of 2 parts of a flushed phthalocyanine blue pigment paste (12 percent pigment) and 10 parts of Cellosolve acetate, then applied in the manner described above and baked for 120 and 150 seconds, respectively, the films provided still had a pencil hardness of H.

Example VI

A composition similar to that of Composition A was prepared employing the reaction product of Example II. Said reaction product being 52.0 percent total solids reduced in a 50:50 blend of Cellosolve acetate and Solvesso 150 and comprised of about 76.5 percent by weight of a hydroxyl-containing acrylic interpolymer containing 15.8 percent 2-hydroxyethyl acrylate, 27.8 percent styrene, 34.5 percent butyl acrylate, and 21.9 percent methacrylonitrile; and about 23.5 percent of an adduct comprised of 2,4-toluene diisocyanate and propylenimine.

The reaction products may be formulated in a manner other than in the examples disclosed hereinabove, for example, the hydroxy-containing acrylic polymer may employ hydroxy-functional monomer such as 2 - hydroxypyropyl methacrylate, 4 - hydroxybutyl methacrylate, and the like. Likewise, various other ethylenically unsaturated monomers may be polymerized with the hydroxy-containing monomers, for example, alpha-methyl styrene, 2-methyl-propene, alpha-chlorostyrene, vinyl propionate, isobutyl acrylate, methacrylonitrile, crotonic acid, and the like. Other diisocyanates such as isophorone diisocyanate may readily be employed. Aziridines such as 1,2-dodecylenimine, 1,1 - dimethyl ethylenimine, and the like may be used to replace ethylenimine. Also active hydrogen-containing compounds such as diamines, triamines and tetramines, hydroxyl-functional polyesters, mercapto-containing compounds and the like may be utilized to crosslink and cure the compositions herein. In addition, other pigments and additives may be incorporated as desired.

According to the provisions of the patent statutes, there are described above the invention and what are now considered to be its best embodiments. However, within the scope of the appended claims, it is to be understood that the invention may be practiced otherwise than as specifically described.

We claim:

1. A composition comprising a reaction product of
   (a) a hydroxy group containing organic material having a hydroxyl functionality of at least 3.0; and
   (b) an aziridine-diisocyanate adduct containing an isocyanate group wherein said aziridine has the general formula

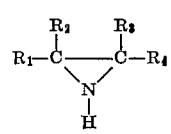

wherein $R_1$, $R_2$, $R_3$ and $R_4$ are each selected from the group consisting of hydrogen, alkyl, aryl, alkaryl and aralkyl.

2. The composition of claim 1 after curing.

3. A substrate having a cured coating thereon, said cured coating being derived from the composition of claim 1.

4. A composition comprising a reaction product of:
   (a) from about 95 to about 50 percent by weight of (a) and (b) of a hydroxyl group containing organic material having a hydroxyl functionality of at least 3.0; and
   (b) from about 5 to about 50 percent by weight of (a) and (b) of an aziridine-diisocyanate adduct containing an isocyanate group wherein said aziridine has the general formula:

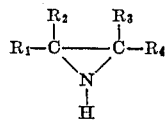

wherein $R_1$, $R_2$, $R_3$ and $R_4$ are each selected from the group consisting of hydrogen, alkyl, aryl, alkaryl and aralkyl.

5. A composition as in claim 4 wherein the hydroxy group containing organic material is selected from the group consisting of homopolymers or copolymers of hydroxyalkyl esters, polymers of an unsaturated primary aliphatic alcohol and at least one monomer containing a $CH_2=C<$ group, hydroxyl containing polyesters, polyether, polyols, polymers of vinyl alcohol, hydroxyl-modified vinyl halide polymers, epoxide resins, and hydroxyl-containing acrylic interpolymers.

6. A composition as in claim 5 wherein the hydroxyalkyl ester is hydroxyethyl acrylate or methacrylate.

7. A composition as in claim 5 wherein the hydroxyl-containing acrylic interpolymer is an interpolymer of an ethylenically unsaturated organic nitrile, a hydroxyl-containing ester of acrylic or methacrylic acid and at least one other alpha, beta ethylenically unsaturated monomer.

8. A composition as in claim 5 wherein the hydroxyl-containing acrylic interpolymer is an interpolymer of an ethylenically unsaturated carboxylic acid amide, an alpha, beta ethylenically unsaturated hydroxyl-containing monomer and at least one other alpha, beta ethylenically unsaturated monomer.

9. A composition as in claim 4 wherein the adduct is prepared by reacting about 1 mole of an aziridine with about 1 mole of a diisocyanate.

10. A composition as in claim 4 wherein the aziridine is ethylenimine or 1,2-propylenimine.

11. A composition as in claim 4 wherein the diisocyanate is selected from a member of the class consisting of 2,4-toluene diisocyanate isophorone diisocyanate, hydrogenated toluene diisocyanate and trimethyl hexamethylene diisocyanate.

12. The composition of claim 4 after curing.

13. A composition comprising:
    (a) a reaction product of:
        (1) from about 95 to about 50 percent by weight of (1) and (2) of a hydroxy group containing organic material having a hydroxyl functionality of at least 3.0;
        (2) from about 5 to about 50 percent by weight of (1) and (2) of an aziridine-diisocyanate adduct containing an isocyanate group wherein said aziridine has the general formula

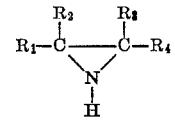

wherein $R_1$, $R_2$, $R_3$ and $R_4$ are each selected from the group consisting of hydrogen, alkyl, aryl, alkaryl and aralkyl; and
    (b) catalyst for curing said reaction product.

14. A composition as in claim 13 wherein the catalyst is an acid catalyst selected from a member of the group consisting of hydrochloric acid, methane sulfonic acid, trichloroacetic acid, sulfuric acid and para-toluene sulfonic acid.

15. The composition of claim 13 after curing.

16. A substrate having a cured coating thereon, said cured coating being derived from the composition of claim 13.

17. A composition comprising:
    (a) a reaction product of:
        (1) from about 95 to about 50 percent by weight of (1) and (2) of a hydroxy group containing organic material having a hydroxyl functionality of at least 3.0;
        (2) from about 5 to about 50 percent by weight of (1) and (2) of an aziridine-diisocyanate adduct containing an isocyanate group wherein said aziridine has the general formula

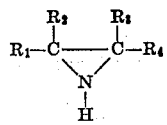

wherein $R_1$, $R_2$, $R_3$ and $R_4$ are each selected from the group consisting of hydrogen, alkyl, aryl, alkaryl and aralkyl; and
(b) a crosslinking agent for reaction product (a).

18. A composition as in claim 17 wherein the crosslinking agent is an active hydrogen-containing organic material.

19. A composition as in claim 18 wherein the active hydrogen-containing organic material is a material having a plurality of groups selected from the class of hydroxyl, primary or secondary, amino, mercapto and carboxyl groups.

20. A composition as in claim 17 wherein the crosslinking agent is selected from a member of the class consisting of hydroxyl containing polyesters, polyhydric polyalkylene ethers, polyhydric polythioethers, polyacetals, aliphatic polyols, polyamines, dimer acids, trimer acids, oil modified alkyd resins, hydroxyl-containing interpolymers, and carboxyl group containing acrylic polymers.

21. A composition as in claim 17 wherein the crosslinking agent is a homopolymer or a copolymer of a hydroxy alkyl ester of an ethylenically unsaturated acid.

22. The composition of claim 17 after curing.

23. A substrate having a cured coating thereon, said cured coating being derived from the composition of claim 17.

24. A method of preparing a reaction product which comprises the steps of:
(a) reacting an aziridine with a diisocyanate to provide an adduct containing an isocyanate group wherein said aziridine has the general formula:

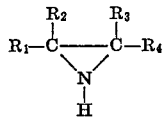

wherein $R_1$, $R_2$, $R_3$ and $R_4$ are each selected from the group consisting of hydrogen, alkyl, aryl, alkaryl, and aralkyl; and
(b) admixing and reacting said adduct with a hydroxy group containing organic material.

25. A method of preparing a reaction product which comprises the steps of
(a) reacting an aziridine with a disisocyanate to provide an adduct containing an isocyanate group wherein said aziridine has the general formula:

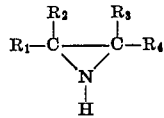

wherein $R_1$, $R_2$, $R_3$ and $R_4$ are each selected from the group consisting of hydrogen, alkyl, aryl, alkaryl, and aralkyl; and
(b) admixing and reacting said adduct with a hydroxy group containing organic material,
wherein said adduct comprises from about 5 to about 50 percent by weight of said reaction product and said hydroxy group containing organic material comprises from about 95 to about 50 percent by weight of said reaction product.

26. A method of preparing a composition which comprises the steps of (a) preparing an adduct containing an isocyanate group by reacting an aziridine with a diisocyanate wherein said aziridine has the general formula:

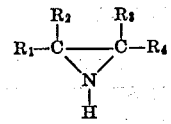

wherein $R_1$, $R_2$, $R_3$ and $R_4$ are each selected from the group consisting of hydrogen, alkyl, aryl, alkaryl and aralkyl;
(b) admixing and reacting said adduct with a hydroxy group containing organic material to provide a reaction product; and
(c) admixing said reaction product with a catalyst or crosslinking agent for said reaction product
wherein said adduct comprises from about 5 to about 50 percent by weight of said reaction product and said hydroxy group containing organic material comprises from about 95 to about 50 percent by weight of said reaction product.

27. A method as in claim 26 wherein catalyst is an acid catalyst selected from a member of the group consisting of hydrochloric acid, methane sulfonic acid, trichloroacetic acid, sulfuric acid and para-toluene sulfonic acid.

28. A method as in claim 26 wherein the hydroxy group containing organic material is selected from the group consisting of hydroxyalkyl esters, polymers of an unsaturated primary aliphatic alcohol and at least one monomer containing a $CH_2=C<$ group, hydroxyl containing polyesters, polyether, polyols, polymers of vinyl alcohol, hydroxyl-modified vinyl halide polymers, epoxide resins, and hydroxyl-containing acrylic interpolymers.

29. A method as in claim 28, wherein the hydroxyalkyl ester is hydroxyethyl acrylate or methacrylate.

30. A method as in claim 29 wherein the hydroxyl-containing acrylic interpolymer is an interpolymer of an ethylenically unsaturated organic nitrile, a hydroxyl-containing ester of acrylic or methacrylic acid and at least one other alpha, beta ethylenically unsaturated monomer.

31. A method as in claim 29 wherein the hydroxyl-containing acrylic interpolymer is an interpolymer of methacrylonitrile, 2-hydroxyethyl acrylate and butyl acrylate.

32. A method as in claim 29 wherein the hydroxyl-containing acrylic interpolymer is an interpolymer of an ethylenically unsaturated carboxylic acid amide, an alpha, beta ethylenically unsaturated hydroxyl-containing monomer and at least one other alpha, beta ethylenically unsaturated monomer.

33. A method as in claim 26 wherein the adduct is prepared by reacting about 1 mole of an aziridine with about 1 mole of a diisocyanate.

34. A method as in claim 26 wherein the aziridine is ethylenimine or 1,2-propylenimine.

35. A method as in claim 26 wherein the diisocyanate is selected from a member of the class consisting of 2,4-toluene diisocyanate, isophorone diisocyanate, hydrogenated toluene diisocyanate and trimethyl hexamethylene diisocyanate.

36. A method as in claim 26 wherein the cross-linking agent is an active hydrogen-containing organic material.

37. A method as in claim 35 wherein the active hydrogen-containing organic material is a material having a plurality of groups selected from the class of hydroxyl, primary or secondary, amino, mercapto and carboxyl groups.

38. A method as in claim 35 wherein the cross-linking agent is selected from a member of the class consisting of hydroxyl containing polyesters, polyhydric polyalkylene ethers, polyhydric polythioether, polyacetals, aliphatic polyols, polyamines, dimer acids, trimer acids, oil modified alkyd resins, hydroxyl-containing copolymer and interpolymer, and carboxyl group containing acrylic polymer.

39. A method as in claim 26 wherein the cross-linking agent is a homopolymer of 2-ethylhexyl acrylate or a copolymer of methylmethacrylate and 2-hydroxyethyl acrylate.

References Cited
UNITED STATES PATENTS

| | | | |
|---|---|---|---|
| 3,446,812 | 5/1969 | Seeger et al. | 260—2 EN |
| 3,337,533 | 8/1967 | Ham | 260—77.5 CR |
| 3,542,505 | 11/1970 | Pittman et al. | 260—2 EN |
| 2,886,455 | 5/1959 | Doggett et al. | 106—252 |

OTHER REFERENCES

Hawley (ed.) The Condensed Chemical Dictionary, 8th Ed., Van Nostrand, New York, 1971, p. 86.

M. J. WELSH, Primary Examiner

U.S. Cl. X.R.

117—128.4, 132 B; 260—22 CQ, 77.5 AT, 239 E